United States Patent Office 3,562,192
Patented Feb. 9, 1971

3,562,192
INTERPOLYMER OF 2,3-DICHLORO-1,3-BUTADIENE AND BLENDS THEREOF WITH CHLORINATED RUBBER
Wendell R. Conard, Kent, Ohio, assignor to The Firestone Tire & Rubber Company, Akron, Ohio, a corporation of Ohio
No Drawing. Filed May 8, 1968, Ser. No. 727,701
Int. Cl. C08d 9/16
U.S. Cl. 260—3.5     16 Claims

ABSTRACT OF THE DISCLOSURE

The product described herein comprises a terpolymer of 2,3-dichloro-1,3-butadiene, acrylonitrile and a third comonomer selected from chlorostyrene, α-methylstyrene and ethyl acrylate. Copolymers of dichlorobutadiene with either acrylonitrile or chlorostyrene are known. However, while these have good adhesive properties, they do not have the desired solubility properties, and they must be de-gelled and require heating prior to application. In contrast the terpolymers of this invention have improved solubility and can be applied "cold," that is without prior heating.

BACKGROUND OF THE INVENTION

Field of the invention

This invention relates to an improved adhesive composition. More specifically it relates to a terpolymer of 2,3-dichloro-1,3-butadiene having improved solubility characteristics. Still more specifically, it relates to a terpolymer of 2,3-dichloro-1,3-butadiene, acrylonitrile or methacrylonitrile and chlorostyrene, α-methylstyrene or ethylacrylate.

Related prior art

The prior art discloses polymers of dichlorobutadiene as well as various copolymers thereof. However, those which are known to have good adhesive properties have the disadvantages of poor solubility or tendency toward gelation and the necessity for the application of heat prior to application for adhesive purposes. In such copolymers in which the comonomer is of a type to give improved solubility or in which the amount of comonomer is increased to give improved solubility, the adhesive properties are very poor.

For example, Kuhn U.S. Pat. 2,581,920 discloses polymers of 2,3-dichlorobutadiene, including copolymers with numerous comonomers including α - methylstyrene, nuclearly chlorinated styrenes, methacrylonitrile and the like. However, these polymers form gels either immediately upon polymerization or after standing for even relatively short storage periods, and even if they are immediately combined with the other components of the adhesive compositions. Consequently these polymers require heating in an organic solvent such as toluene at a temperature of at least 60° C. to break the gel and convert the copolymer to a usable composition. Moreover these polymers showing this tendency for gelation require heat prior to application to render them fluid for subsequent application.

Subsequent to the issuance of the above patent, Reynolds U.S. Pat. 2,725,373 was granted on a process, and the product obtained thereby, for brominating polymers of 2,3-dichloro-1,3-butadiene to improve the solubility of the polymers and thereby avoid the necessity to break the gel and to heat prior to application of the polymer as an adhesive.

SUMMARY OF THE INVENTION

Surprisingly it has now been found that a polymer of 2,3-dichloro-1,3-butadiene can be prepared having improved solubility and adhesive characteristics that does not require de-gelling nor heating prior to application. This new polymer is produced by copolymerizing 2,3-dichloro-1,3-butadiene with acrylonitrile, or methacrylonitrile, and either a nuclear-chlorinated styrene or α-methyl styrene or ethyl acrylate. The improved solubility and adhesive characteristics of this terpolymer are surprising in view of the fact that the copolymers of the dichlorobutadiene individually with the acrylonitrile, or with chlorostyrene, do not show the solubility characteristics of the present terpolymer, and in each case such corresponding copolymers need to be heated before application as an adhesive. It is even more surprising that of all the various comonomers suggested in the Kuhn patent for copolymerization with the dichlorobutadiene, these three comonomers are the only ones found to perform satisfactorily in the terpolymers for preventing gelation and for avoiding the need for heating of the copolymer prior to application as an adhesive.

If acrylonitrile is the only comonomer used with the dichlorobutadiene, the copolymer gels either immediately upon polymerization or upon standing. Even if the copolymer is processed immediately with the other components normally used in the adhesive mixture the gelation occurs upon standing. Consequently the mixture will still require heating in order to get the adhesive composition into a fluid condition prior to application.

On the other hand if more acrylonitrile is used, or third comonomers other than chlorostyrene, α-methylstyrene or ethyl acrylate are used to inhibit or avoid gelation and to improve solubility the resultant copolymers have very poor adhesive properties.

The most favorable results are obtained in the terpolymer when the monomeric mixture used for the copolymerization contains approximately 70–90%, preferably 75–80%, by weight of the dichlorobutadiene monomer, 5–10%, preferably 6–8%, acrylonitrile or methacrylonitrile and 5–25%, preferably 10–25%, by weight of chlorostyrene or other third monomer as indicated above. The preferred ranges are 10–16% for chlorostyrene and for α-methylstyrene, and 15–25% for ethyl acrylate. The resultant terpolymers generally contain in the polymer molecules about 0.5–5%, preferably 1–2% acrylonitrile or methacrylonitrile, 1–10%, preferably 2–5% of the third monomer with the remainder being dichlorobutadiene and related monomers, there being at least 60%, preferably at least 75% 2,3-dichloro-1,3-butadiene.

While relatively pure 2,3-dichloro-1,3-butadiene can be used, for reasons of availability and economics the monomer is generally a mixture containing a major portion of the 2,3-dichloro-1,3-butadiene with the balance being primarily dichlorobutadiene isomers and related compounds. A monomer mixture is commercially available which contains about 70% of 2,3-dichloro-1,3-butadiene with the remainder comprising other dichlorobutadienes, chlorovinyl acetylene, trichlorobutadiene and the like. While these other monomeric materials are also copolymerized to a considerable extent, the resultant copolymer with the acrylonitrile and the third monomer, namely chlorostyrene, alpha-methylstyrene or ethyl-acrylate, is referred to herein as a "terpolymer" for purpose of simplicity.

In the commercial 2,3-dichloro-1,3-butadiene used in the examples described below there are a number of isomers and related compounds which copolymerize with the 2,3-dichloro-1,3-butadiene. These include 1,2-dichloro-1,3-butadiene, monochloro-1,3-butadiene, trichlorobutadiene and chloro-vinylacetylene. There is also present 10–20% of non-polymerizable compounds such as 1,4-dichloro-1,3-butadiene, 1,3-dichloro-1,3-butadiene and dichlorobutene.

Advantageously the polymerization is conducted in an inert solvent such as a hydrocarbon, preferably an aromatic hydrocarbon such as toluene or xylene, or a chlorinated hydrocarbon. Generally a solvent is selected which is also suitable for the ultimate adhesive composition and therefore does not need to be removed. A wide variety of solvents may be used for this purpose including benzene, toluene, xylene, ethylene dichloride, cyclohexane, carbon tetrachloride, trichloroethylene, dichlorobenzenes, chlorobenzene, tetrachloroethylene, trichlorobenzenes and the like. In cases where the solvents are toxic, such as di- and trichlorobenzenes, they are used only where special precautions can be taken in their use and application of the adhesive compositions. It is generally desirable to conduct the polymerization in solution containing about 10–50% by weight of the monomer mixture.

The polymerizations are generally conducted at a temperature of 40–100° C., preferably 70–90° C., depending upon the particular catalyst or activator being used. With benzoyl peroxide a temperature of about 80° C. is preferred. Conditions are advantageously those which produce polymers having a relative viscosity of 1.90–2.30 in a 4 percent solution in tetrachloroethylene when measured at 25° C.

For catalyzing or activating the polymerization various well-known free-radical generating catalysts such as peroxides and hydroperoxides, including the following can be used:

Cumene hydroperoxide
Perheptanoic acid
Dichlorobenzoyl peroxide
Tertiary-butyl hydroperoxide
Benzoyl peroxide
Tertiary-butyl perbenzoate
Acetyl benzoyl peroxide
Capryly peroxide
Lauroyl peroxide
Hydroxyheptyl peroxide
Methylethyl ketone peroxide
1-hydroxycyclohexyl hydroperoxide-1
Ditertiary-butyl perphthalate
Dibenzaldiperoxide
Tertiary-butyl peroxide
2,2-(tertiary-butylperoxy) butane
Bis(para-bromobenzoyl) peroxide
Bis(acetyl)peroxide
Bis(parachlorobenzoyl)peroxide
Bis(succinyl)peroxide
Acetylbenzoyl peroxide
Bis(chloroacetyl)peroxide
Bis(acetyl(peroxide
Tertiary-butyl perbenzoate
Tertiary-butyl hydroperoxide
Bis(dichlorobenzoyl)peroxide
Di-isopropylene ozonide and di-isobutylene ozonide
Peracetic acid
Perbenzoic acid
Benzoyl peracetate
Ethyl peroxydicarbonate;

Azo catalysts such as:

Azo-bis-isobutyronitrile
Dimethyl azodiisobutyrate
Azo-bis-(α-methyl)-carboxybutyronitrile and the like;

Redox systems such as:

Ferric sulfate-ascorbic acid-$H_2O_2$
Tributylboran-t-Bu-hydroperoxide
Other trialkylborane-hydroperoxide combinations, and the like.

Generally 0.1%–5% of the catalyst is suitable based on the combined weight of the monomers.

It is preferred that the polymerizations be taken only to such a stage that the product does not reach an infusible, insoluble state. While even such compositions can be used as adhesives by conducting the polymerizations to such a cured state in situ between the materials to be adhered, it is preferable to stop the polymerization at a stage where the resins are fusible and sufficiently soluble in organic solvents to admit application of the adhesives in the form of fluid cements. Generally this condition is maintained by limiting the molecular weight to no more than approximately 75,000. The molecular weight of the terpolymers is advantageously in the range of 30,000–75,000.

In preparing the adhesive compositions, it is desirable in many cases, particularly where elastomers are to be bonded to metallic surfaces that the terpolymers of this invention be mixed with a chlorinated elastomer. Suitable elastomers for this purpose include the well-known chlorinated and hydrochlorinated derivatives of synthetic and natural elastomers, particularly chlorinated natural rubber and chlorinated polybutadiene.

However, other chlorinated and hydrochlorinated elastomers, such as balata, gutta percha, chilte gum, the buna rubbers, polyisobutylene and neoprene, can also be used. Generally, about 10–90% of such a chlorinated elastomer based on the combined weight of chlorinated elastomer and terpolymer may be employed in the adhesive compositions of this invention, particularly for use in adhering elastomers to metals.

The chlorinated elastomers and terpolymers need not be mixed directly but can be applied in layers or coatings on the respective materials to be joined or adhered. The adhesive compositions of this invention are very conveniently applied in the form of a solution or "cements" containing the terpolymer dissolved in a solvent and where a modifier such as the chlorine-containing elastomer is to be included, this can be likewise dissolved in the solvent.

In preparing the adhesive cement, the amount of solvent is adjusted in accordance with the desired application properties in the cement. Generally cements containing 20–95% of solvent are appropriate for application by brushing, spraying, dipping and the like. In addition to application in solution form, the adhesive composition can be applied as an emulsion or latex, in the form of an unsupported film, or in the form of a paper web or metallic foil coated with the composition.

The invention is illustrated by reference to the following examples. These examples are given merely for purpose of illustration and are not intended to limit the scope of the invention nor the manner in which it may be practiced. Parts and percentages are given by weight.

The various polymerizations reported are conducted in 12 ounce polymerization bottles which are capped and placed on a revolving wheel which is completely submerged in a constant temperature bath. At the end of the desired period, the bottles are removed from the bath and cooled to room temperature before the contents of the bottle are removed for further processing.

EXAMPLE I

A polymerization bottle is charged with 100 parts of toluene, 47.5 parts of the commercial chlorinated monomer mixture described above as having 70% 2,3-dichloro-1,3-butadiene, 4.25 parts of acrylonitrile and 0.65 part of benzoyl peroxide. After sealing the bottle and placing it on the wheel in the bath, the polymerization is conducted at 81° C. for 5 hours and 15 minutes. Analysis of the product shows a total solids content of 19.7% and a conversion of 57.5%. The polymer has a plasticity [1]

---

[1] The plasticity test is a measure of the melt flow of a polymer under pressure and is therefore a rough measure of molecular weight. The test is carried out as follows: A 0.5 g. sample of the polymer is placed between two sheets of aluminum foil. The sample is placed in a Carver electric press (platens 6″ x 6″) at the specified temperature (160° C. in this case). The press is closed with slight pressure. After 10 sec. a pressure of 2000 pounds per square inch on the gauge is applied for 30 sec. The sample is removed and cooled. The area of the plaque in sq. mm. is then measured and is recorded as the plasticity. A low molecular weight polymer has high flow and high plasticity.

of 6850 sq. mm. at 160° C., a relative viscosity of 1.96 for a 4% solution in tetrachloroethylene, contains about 2% acrylonitrile and upon standing a substantial amount of gel precipitates.

EXAMPLE II

When this procedure is repeated using methacrylonitrile instead of acrylonitrile, similar results are obtained with a total solids content of 19.1% and 56% conversion. The polymer has a plasticity of 7200 sq. mm. and a relative viscosity of 1.88 for a 4% solution in tetrachloroethylene.

EXAMPLE III

The procedure of Example I is repeated except that in addition to the 4.25 parts of acrylonitrile there is also used 5 parts of a mixture of ortho- and para-chlorostyrenes. The product has a total solids content of 19.8% and 54.4% conversion. The polymer contains about 2% acrylonitrile and about 3% chlorostyrene, and has only moderate turbidity after standing for 5–6 days.

EXAMPLE IV

The procedure of Example I is repeated using in addition to the acrylonitrile 5 parts of $\alpha$-methylstyrene. The product shows a total solids content of 21.2 and 58.3% conversion and the polymer contains about 3% $\alpha$-methylstyrene, and has only very slight turbidity after standing for 6 days.

EXAMPLE V

The procedure of Example I is repeated except that in addition to the acrylonitrile there is used 5 parts of ethyl acrylate. The product has a total solids content of 20.0% and 55% conversion. The polymer contains about 3% ethyl acrylate and has considerable turbidity but no gel precipitation after standing 6 days.

EXAMPLE VI

A number of adhesive compositions are prepared using the copolymers of Examples I, II, III, IV and V respectively. In each case a well-blended mixture is prepared so as to have a total solids content of 24% which comprises 18.8% of the specific copolymer, 66.2% of chlorinated rubber and 15% of carbon black, sufficient toluene being used to give the 24% total solids. Each adhesive composition or cement is tested by application to a sand blasted, degreased steel metal strip and a rubber strip or corresponding size placed thereover. Two test strips are thus prepared for each cement. After the samples are cured for 30 minutes at 312° F. and cooled, the adhesion is tested by determining the pounds pulled on a tensile machine in order to tear the rubber from the steel strip. An Instron Tester or a Scott Tester can be used for this purpose. Table I reports the average pound pull required for the two strips tested for each cement and the average percent stock failure for the respective test pieces.

TABLE I

| Example: | A.N. | M.A.N. | 3rd monomer | Adhesion average pull, lbs. | Percent stock failure |
|---|---|---|---|---|---|
| I | 4.25 | | | 70 | 72 |
| II | | 4.25 | | 68 | 47 |
| III | 4.25 | | 5 Cl-S | 78 | 87 |
| IV | 4.25 | | 5α-M-S | 75 | 75 |
| V | 4.25 | | 5 E-A | 78 | 90 |

As will be noted, each of the tests shows superiority of the terpolymers as compared to those using acrylonitrile or methacrylonitrile without the third monomer.

EXAMPLE VII

The procedure of Example III is repeated a number of times using individually in place of the chlorostyrene 5 parts each respectively of methyl methacrylate, styrene, vinylidene chloride, methylvinylketone and vinyl acetate. When the respective terpolymers are tested in adhesive cements as in Example VI, none of these terpolymers show the improved adhesive properties of the terpolymers of Example VI. The results are shown below in Table II.

TABLE II

| A.N. | 3rd monomer | Adhesion average pull, lbs. | Percent stock failure |
|---|---|---|---|
| 4.25 | 5 MMA | 66 | 50 |
| 4.25 | 5 S | 54 | 15 |
| 4.25 | 5 VCl₂ | 63 | 50 |
| 4.25 | 5 MVK | 53 | 8 |
| 4.25 | 5 VAc | 68 | 62 |

EXAMPLE VIII

The procedure of Example I is repeated a number of times, in each case using 0.5 part of benzoyl peroxide, conducting the polymerization at 80° C. for 3.5 hours, in each case using 4.25 parts of acrylonitrile and using varying amounts of either ortho-chlorostyrene or a mixture of ortho- and para-chlorostyrene with the amounts of the latter being as indicated below in Table III. As will be noted below in Table III, the adhesive properties of the terpolymers when tested according to the procedure of Example VI are much superior to similar adhesives containing the copolymers in which the acrylonitrile is used without the chlorostyrene.

TABLE III

| A.N. | o-ClS | o-p-ClS | Relative viscosity | Plasticity, 160° C. | Average lb. pull | Percent stock failure |
|---|---|---|---|---|---|---|
| 4.25 | | | 2.29 | 5,250 | 54 | 55 |
| 4.25 | 4.25 | | 2.16 | 5,450 | 61.5 | 75 |
| 4.25 | 8.5 | | 2.16 | 5,600 | 65 | 67.5 |
| 4.25 | | 4.25 | 2.23 | 5,300 | 65 | 90 |
| 4.25 | | 8.25 | 2.23 | 5,660 | 65.5 | 100 |

EXAMPLE IX

The procedure of Example I is repeated a number of times using the proportions of comonomers indicated below in Table IV, DCB indicating dichlorobutadiene, AN signifying acrylonitrile and EA representing ethyl acrylate. Both the charge ratios of the comonomers and the proportions in the resultant copolymers are indicated. A number of tests are performed using 32 parts of the copolymer with 68 parts of the chlorinated natural rubber used in Example VI. This chlorinated natural rubber is 67% chlorine and has a viscosity of 125 centipoises in 20% concentration in toluene. The results of the adhesion tests are also given. In order to determine whether larger proportions of acrylonitrile in the copolymer would improve the solubility characteristics, two runs are performed increasing the proportion of acrylonitrile to 12% and 25% respectively. However, as will be noted from the table, the larger proportions of acrylonitrile have a very damaging effect on the adhesive properties, particularly the percent stock failure. Again as noted in the above examples, the third comonomer, namely ethyl acrylate, in this case gives improved results in the adhesion tests.

TABLE IV

| Charge | | | In polymer, DCB/AN/EZ | Relative viscosity [1] | Adhesion average pull, lbs. | Percent stock failure |
|---|---|---|---|---|---|---|
| DCB | AN | EA | | | | |
| 92 | 8 | 0 | 99/1/0 | 1.92 | 70 | 75 |
| 88 | 12 | 0 | 98.5/1.5/0 | 2.22 | 80 | 50 |
| 75 | 25 | 0 | 97.5/3.5/0 | 1.75 | 42 | 0 |
| 79 | 7 | 14 | 95/1/4 | 2.12 | 75 | 100 |
| 73 | 7 | 20 | 94/1/5 | 2.04 | 80 | 100 |

[1] Relative viscosity measured with 1 gram of copolymer in 25 cc. of tetrachloroethylene.

A particularly preferred chlorinated elastomer for preparing the adhesive compositions is one available commercially which has 63–68% chlorine, preferably 67–68%, and has a viscosity of approximately 125 centipoises in a 20% solution in toluene. However, chlorinated elastomers of 100–300 centipoises in similar solutions can also be used and if desired appropriate modifications can be used in the concentrations to give the desired fluidity in the adhesive cement. Generally, however, it is desirable to use sufficient solvent to give a solids content of 20–30% and it is generally desirable to use 0.1–9 parts by weight of chlorinated elastomer per part by weight of terpolymer.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. A copolymer of improved adhesive properties comprising at least 60% by weight of 2,3-dichloro-1,3-butadiene, 0.5–5% by weight of a member of the class consisting of acrylonitrile and methacrylonitrile and 1–10% by weight of a third comonomer selected from the class consisting of a nuclear chlorostyrene, α-methylstyrene and ethyl acrylate.

2. The coploymer of claim 1 in which said copolymer has a molecular weight of 30,000–70,000.

3. The copolymer of claim 2 in which there is at least 75% by weight of 2,3-dichloro-1,3-butadiene.

4. The copolymer of claim 3 in which there is 1–3% by weight of acrylonitrile.

5. The copolymer of claim 4 in which there is 2–5% by weight of said third comonomer.

6. The copolymer of claim 2 in which said third comonomer is a nuclear chlorostyrene.

7. The copolymer of claim 2 in which said third comonomer is α-methylstyrene.

8. The copolymer of claim 2 in which said third comonomer is ethylacrylate.

9. The copolymer of claim 1 in which said copolymer has a relative viscosity of 1.90–2.30 when measured at 25° C. in a 4% solution in tetrachloroethylene.

10. An adhesive composition containing 70–80% by weight of solvent, and the solids content of said composition consisting essentially of 20–25 parts of said copolymer of claim 1 per 100 parts of a chlorinated rubber.

11. The adhesive composition of claim 10 in which the solids content comprises 15–22% by weight of said copolymer of claim 1, 58–80% by weight of a chlorinated ruber and 5–20% of carbon black.

12. The adhesive composition of claim 11 in which said solvent is an aromatic hydrocarbon selected from the class consisting of toluene, xylene, benzene and ethylbenzene.

13. The adhesive composition of claim 12 in which the solids content is approximately 24% by weight.

14. The adhesive composition of claim 10 in which said chlorinated rubber is a chloinated natural rubber having 63–68% chlorine therein, and a viscosity of 100–300 centipoises in a 20% solution in toluene.

15. The adhesive composition of claim 14 in which said solids content comprises 15–22% by weight of said copolymer of claim 1, 58–80% by weight of said chlorinated rubber and 5–20% of carbon black.

16. The adhesive composition of claim 15 in which the chlorine content of the chlorinated rubber is 66–68% and the viscosity is 125 centipoises in a 20% solution in toluene.

References Cited

UNITED STATES PATENTS 2,581,920   1/1952   Kuhn _____ 260—890

FOREIGN PATENTS 6,412,893   5/1965   Netherlands _____ 260—3.5

MURRAY TILLMAN, Primary Examiner

M. J. TULLY, Assistant Examiner

U.S. Cl. X.R.

161—218, 254; 156—333; 260—33.6, 41.5, 80.7, 890

PO-1050
(5/69)

UNITED STATES PATENT OFFICE
CERTIFICATE OF CORRECTION

Patent No. __3,562,192__ Dated __February 9, 1971__

Inventor(s) __Wendell R. Conard__

It is certified that error appears in the above-identified patent and that said Letters Patent are hereby corrected as shown below:

Col. 3, line 45, "Bis(acetyl)peroxide" should read
--Bis(phthalyl)peroxide--

Col. 3, line 50, "Bis(acetyl(peroxide" should read
--Bis(acetyl)peroxide--

Col. 6, line 61, (TABLE IV),

"In polymer,   should read    --In polymer
DCB/AN/EZ"                     DCB/AN/EA Col. 8, line 15, second occurrence, "chloinated" should rea
--chlorinated--

Signed and sealed this 18th day of January 1972.

(SEAL)
Attest:

EDWARD M. FLETCHER, JR.　　　ROBERT GOTTSCHALK
Attesting Officer　　　　　　Acting Commissioner of Patents